(12) United States Patent
Abdelmalak et al.

(10) Patent No.: US 9,847,531 B2
(45) Date of Patent: Dec. 19, 2017

(54) CURRENT COLLECTORS FOR IMPROVED SAFETY

(71) Applicant: UT-Battelle, LLC, Oak Ridge, TN (US)

(72) Inventors: Michael Naguib Abdelmalak, Knoxville, TN (US); Srikanth Allu, Oak Ridge, TN (US); Nancy J. Dudney, Knoxville, TN (US); Jianlin Li, Knoxville, TN (US); Srdjan Simunovic, Knoxville, TN (US); Hsin Wang, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 138 days.

(21) Appl. No.: 14/955,366

(22) Filed: Dec. 1, 2015

(65) Prior Publication Data

US 2017/0155155 A1 Jun. 1, 2017

(51) Int. Cl.
| | |
|---|---|
| *H01M 4/13* | (2010.01) |
| *H01M 4/66* | (2006.01) |
| *H01M 4/70* | (2006.01) |
| *H01M 10/0525* | (2010.01) |
| *H01M 10/42* | (2006.01) |
| *H01M 4/02* | (2006.01) |

(52) U.S. Cl.
CPC .............. *H01M 4/70* (2013.01); *H01M 4/13* (2013.01); *H01M 4/661* (2013.01); *H01M 4/667* (2013.01); *H01M 10/0525* (2013.01); *H01M 10/4235* (2013.01); *H01M 2004/027* (2013.01); *H01M 2004/028* (2013.01)

(58) Field of Classification Search
CPC ...... H01M 4/70; H01M 10/0525; H01M 4/13; H01M 4/667; H01M 4/661; H01M 10/4235; H01M 2004/027; H01M 2004/028
See application file for complete search history.

(56) References Cited

U.S. PATENT DOCUMENTS

| | | | |
|---|---|---|---|
| 6,093,503 A | 7/2000 | Isoyama et al. | |
| 6,645,668 B2 | 11/2003 | Etou | |
| 8,017,264 B2 | 9/2011 | Hong et al. | |
| 2009/0085061 A1* | 4/2009 | Yamagiwa | H01L 29/0692 257/173 |
| 2009/0181303 A1* | 7/2009 | Neudecker | H01M 2/0212 429/209 |
| 2013/0040189 A1 | 2/2013 | Lim et al. | |
| 2013/0316230 A1 | 11/2013 | Liu | |
| 2016/0020461 A1* | 1/2016 | Yang | H01M 4/366 429/231.95 |
| 2016/0126535 A1 | 5/2016 | Qiao et al. | |

FOREIGN PATENT DOCUMENTS

| | | |
|---|---|---|
| DE | 4028585 C1 | 9/1991 |
| DE | 102013202288 | 8/2014 |
| EP | 1122132 A1 | 8/2001 |
| FR | 2616958 A1 | 12/1988 |
| FR | 2998421 A1 | 5/2014 |
| KR | 20120051768 | 5/2012 |

OTHER PUBLICATIONS

Sahraei et al: "Modeling of cylindrical and pouch cells for crash energy absorption and electric short circuit Modeling of cylindrical and pouch cells for crash energy absorption and electric short circuit", MIT, Crash Safe Energy Storage Systems for Electric Vehicles, Golden, CO, Nov. 12, 2012.
Lecoeur et al.: "Al Current Collectors for Li-Ion Batteries Made via a Template-Free Electrodeposition Process in Ionic Liquids", J. Electrochem. Soc. 2010, vol. 157, Issue 6, pp. A641-A646.
Xia et al: "A positive-temperature-coefficient electrode with thermal protection mechanism for rechargeable lithium batteries", Chinese Science Bulletin, Nov. 2012 vol. 57 No. 32: 4205-4209.
Wang et al: "Heterogeneous current collector in lithium-ion battery for thermal-runaway mitigation", Applied Physics Letter 110, 083902, Feb. 21, 2017.
Yao et al: "LiFePO4-based electrode using micro-porous current collector for high power lithium ion battery", Journal of Power Sources 173 ( Jul. 2007) 545-549.
Hartmann et al.: Perforated Current Collector Foils for Lithium-ion Batteries, Fraunhofer Institute for Lase Technology ILT, www.ilt.fraunhofer.de, Jun. 2012.
Whitehead et al.: "Metallised Polymer Current Collectors for Lithium-Ion Batteries" ECS Meeting in Phoenix, Fall 2000.
Wang et al.: "Lithium-Ion Battery Keeps Its Cool", MIT REview, May 24, 2011.
Myung et al.: "Electrochemical behavior and passivation of current collectors in lithium-ion batteries", J. Mater. Chem., 2011,21, 9891-9911.
TimCal Flyer for Dispersion for Current Collector Coating for Lithium-Ion Batteries, dated 2012.
Wheelerl et al.: "Small Scale Mechanical Characterization of Thin Foil Materials via Pin Load Microtesting, Experimental Mechanics" (2015) 55:1375-1387.
Wang et al.: "Internal-short-mitigating current collector for lithium-ion battery" Journal of Power Sources 349 (2017) 84-93.

* cited by examiner

Primary Examiner — Muhammad Siddiquee
(74) Attorney, Agent, or Firm — Fox Rothschild LLP

(57) ABSTRACT

A battery electrode assembly includes a current collector with conduction barrier regions having a conductive state in which electrical conductivity through the conduction barrier region is permitted, and a safety state in which electrical conductivity through the conduction barrier regions is reduced. The conduction barrier regions change from the conductive state to the safety state when the current collector receives a short-threatening event. An electrode material can be connected to the current collector. The conduction barrier regions can define electrical isolation subregions. A battery is also disclosed, and methods for making the electrode assembly, methods for making a battery, and methods for operating a battery.

29 Claims, 21 Drawing Sheets

CURRENT COLLECTORS FOR IMPROVED SAFETY

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to battery technology, and more particularly to battery safety technology.

BACKGROUND OF THE INVENTION

Physical damage to a battery from mechanical abuse can result in dangerous thermal runaway conditions. Particularly in the case of an object penetrating the battery, and sometimes when penetration does not occur, a short circuit can result which causes very rapid discharge and heat generation within the cell. This rapid discharge condition can in some cases result in fire or even explosion. Attempts in the industry to design batteries which will control the harmful effects of physical damage to the battery have not been practical or successful.

SUMMARY OF THE INVENTION

A battery electrode assembly includes a current collector comprising conduction barrier regions having a conductive state in which electrical conductivity through the conduction barrier region is permitted, and a safety state in which electrical conductivity through the conduction barrier regions is reduced. The conduction barrier regions change from the conductive state to the safety state when the current collector receives a short-threatening event. An electrode material can be connected to the current collector.

The current collector can include a plurality of electrical isolation subregions defined at least in part by the conduction barrier regions formed in the current collector. The isolation subregions have a conductive state in which the isolation subregions are not electrically isolated from other isolation subregions, and a safety state in which at least one isolation subregion is electrically isolated from at least one adjacent isolation subregion such that electrical conductivity through the adjacent isolation subregions in the safety state is reduced. The electrical isolation subregions change from the conductive state to the safety state when respective conduction barrier regions defining the isolation subregions are changed from the conductive state to the safety state.

The area of the isolation subregion can be selected to limit the battery capacity that can be discharged through the isolation subregions to less than the capacity which causes sufficient Joule heating to initiate thermal runaway of a fully charged battery. The dimension of the subregions can be less than 1 cm$^2$ for Li-ion battery electrodes. The area of the isolation subregions can be selected to limit capacity to <10 mAh while in the safety state. The conduction barrier regions when in the safety state can have a resistance that is at least 1000 times larger than the resistance in the conductive state.

The conductive barrier regions can be changed from the conductive state to the safety state by physical deformation of at least a portion of the current collector. The physical deformation of the current collector acts to cause physical deformation of at least one conduction barrier region of at least one isolation subregion to change the at least one isolation subregion from the conductive state to the safety state. The conduction barrier regions can include voids in the current collector and the physical deformation can be an expansion of the voids.

The conduction barrier regions can include transverse, non-connecting elongated regions. Physical deformation of the current collector can cause at least one of the transverse conduction barrier regions to be physically deformed and extended so as to intersect with an adjacent transverse conduction barrier region to cause at least one associated isolation subregion to change from the conductive state to the safety state. The isolation subregions can be rectangular. The isolation subregions can be triangular.

The conduction barrier regions can include voids extending through the current collector. The conduction barrier regions can include slits. The conduction barrier regions can include interconnecting slits. The interconnecting slits can be Y-shaped and the isolation subregions can be triangular. The conduction barrier region can include perforations.

At least two isolation subregions can have different dimensions. The differently dimensioned isolation subregions can be provided on the current collector as a gradient of at least one selected from the group consisting of the pattern and the size of the pattern of the isolation subregions. An isolation subregion when in the safety state can be electrically isolated from every adjacent isolation subregion. The electrical conductivity between adjacent isolation subregions in the safety state can be eliminated.

The current collector can include metal. The current collector can include a metalized polymer. The electrode assembly can include multilayer coatings of at least one selected from the group consisting of metal, carbon, ceramic and glass films on a polymer support. The current collector can include multilayer coatings of at least one selected from the group consisting of metal, carbon, ceramic and glass films on a metal support.

The current collector can include bonding sections bonded together by at least one selected from the group consisting of adhesive and spot welds. The current collector can include a polymer and the conduction barrier regions of the polymer have been rendered frangible. The polymer can be treated to be brittle and the polymer is selected such that its tensile strength is reduced by at least 10-fold after treatment. The polymer can be treatable to be brittle and the elastic limit of the polymer after curing reduced at least 5 or 10-fold from the elastic limit before treatment.

A battery can include an anode electrode comprising an anode current collector and an anode electrode material and a cathode electrode comprising a cathode current collector and a cathode electrode material, and an electrolyte. At least one of the anode current collector and the cathode current collector can include a current collector comprising conduction barrier regions having a conductive state in which electrical conductivity through the conduction barrier regions is permitted, and a safety state in which electrical conductivity through the conduction barrier regions is reduced. The conduction barrier regions change from the conductive state to the safety state when the current collector receives a short-threatening event.

The anode current collector and the cathode current collector can include a plurality of electrical isolation subregions defined at least in part by conduction barrier regions formed in the current collector. The isolation subregions have a conductive state in which the isolation subregions are not electrically isolated from other isolation subregions, and a safety state in which at least one isolation subregion is electrically isolated from at least one adjacent isolation subregion such that electrical conductivity through the adjacent isolation subregions in the safety state is reduced. The electrical isolation subregions of the anode current collector and the electrical isolation regions of the cathode current collector can define overlapping isolation regions.

A current collector for a battery can include a plurality of electrical isolation subregions defined at least in part by conduction barrier regions formed in the current collector. The isolation subregions have a conductive state in which the isolation subregions are not electrically isolated from other isolation subregions, and a safety state in which at least one isolation subregion is electrically isolated from at least one adjacent isolation subregion such that electrical conductivity through the adjacent isolation subregions in the safety state is reduced.

A method of making an electrode can include the step of forming in a current collector a plurality of electrical isolation subregions defined at least in part by conduction barrier regions formed in the current collector. The isolation subregions have a conductive state in which the isolation subregions are not electrically isolated from other isolation subregions, and a safety state in which at least one isolation subregion is electrically isolated from at least one adjacent isolation subregion such that electrical conductivity through the adjacent isolation subregions in the safety state is reduced. The method can further comprise the step of making a battery with the current collector.

A method of operating a battery can include the steps of forming the battery with at least one current collector comprising conduction barrier regions having a conductive state in which electrical conductivity through the conduction barrier region is permitted, and a safety state in which electrical conductivity through the conduction barrier regions is reduced. The conduction barrier regions change from the conductive state to the safety state when the current collector receives a short-threatening event. An electrode material can be connected to the current collector. A short-threatening event can be experienced at a conduction barrier region of the at least one current collector, whereupon the conduction barrier region will change from the conductive state to the safety state. The battery is operated with the at least one conduction barrier region in the safety state and at least one other conduction barrier region in the conductive state.

BRIEF DESCRIPTION OF THE DRAWINGS

There are shown in the drawings embodiments that are presently preferred it being understood that the invention is not limited to the arrangements and instrumentalities shown, wherein:

FIG. 1B) a short-threatening force; FIG. 1C) a potential short-circuit location and localized change of conduction barrier regions to the safety state; and FIG. 1D) electric flow through the electrode while in the safety state.

FIG. 10B) arrangement of the conduction barrier pattern to define triangular electrical isolation subregions, in the conductive state; and FIG. 10C) the triangular electrical isolation subregions in the safety state after a short-threatening event.

FIG. 20B) active material on metal foil supported by a polymer according to an embodiment of the invention; and FIG. 20C) active material on metal foil supported by a glass or ceramic layer on a polymer layer according to another embodiment of the invention.

DETAILED DESCRIPTION OF THE INVENTION

Figure 1A:
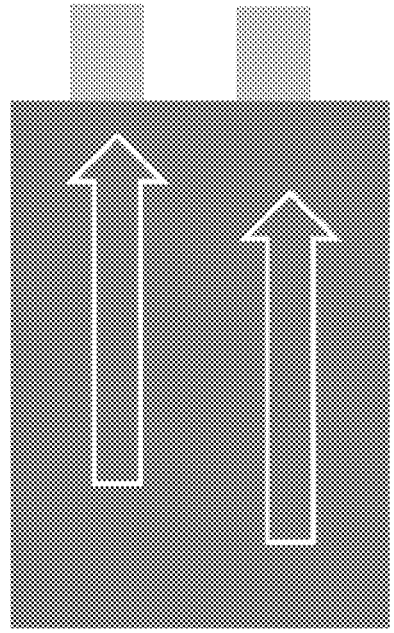
FIGS. 1A, 1B, 1C and 1D are schematic diagrams of an electrode according to the invention illustrating FIG. 1A) current flow through the electrode.

There is shown in FIG. 1A a battery electrode operating in customary fashion. Under normal operation, all of the capacity and energy of the battery, determined by the amount of active electrode material coated on the conductive current collectors, is available for use. This is illustrated by the sweeping arrows of the diagram.

Figure 1B:
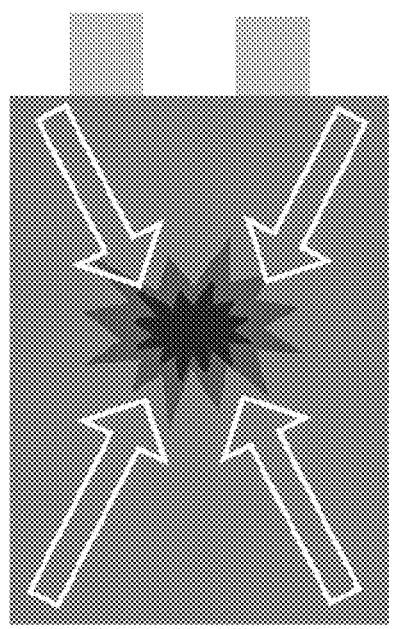
Figure 1C:
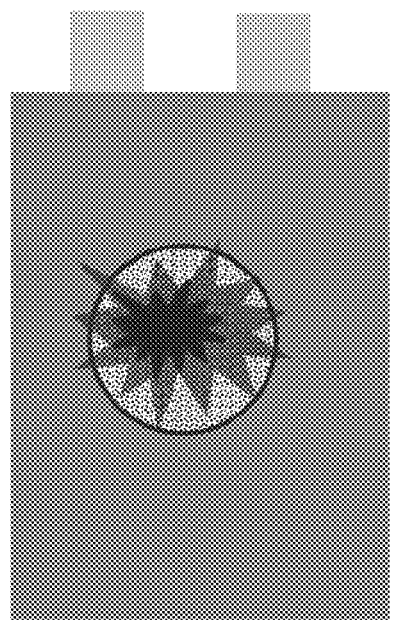

A battery can be shorted internally by a flaw or damage, which can be caused by an external force or penetrating object as depicted by the converging arrows in FIG. 1B. All of the energy generated at the electrode can flow through one or a number of short circuits formed between anode and cathode, as shown in FIG. 1C. This can generate significant localized heating. This is shown as the star burst. Maximum heating from current through a short occurs for the fully charged battery. A battery can also be accidently shorted externally with a low resistance between the battery anode and cathode tabs.

When a battery is damaged mechanically by a sudden crush or penetration impact to the battery face or end or edge, this creates places where a short may occur between the anode and cathode. This is a short-threatening event. The exact nature of the impact depends on the battery design, prismatic or cylindrical or other. For illustration here, all assume a pouch type layered battery, but this invention also applies to many different battery designs including cylindrical wound, z-fold, or other battery designs and packaging. The electrode of the invention can be designed to respond before the separator is damaged or pierced. The short-threatening event refers to a potential internal short which can result from a large sudden impact or in some cases where damage is localized as when a corner is bent or a small portion of the electrode is pierced as by a pin or nail. The time, area and magnitude (strain) of a deformation as well as the battery type, size and construction can be used to determine whether an impact is a short—threatening event and the electrode can be designed accordingly. Also, the potential use of the battery can be used to anticipate the short-threatening event, such that for a military use might projectile damage to the battery might be anticipated.

The present invention acts to prevent the damage that can result from such short-threatening damage. The electrode of the invention, when damaged by mechanical deforming or penetrating force, causes the anode or cathode or both to separate into smaller pieces that are electrically disconnected. Thus any short through the electrolyte and separator has limited access to the totality of the battery capacity and the amount of current through the short will be limited to a small fraction of the total battery capacity, shown as the circled area around the star burst in FIG. 1C. With a smaller peak current and shorter duration of current flow, local heating will be reduced. With small enough pieces, the heating will be well below that which causes a thermal runaway condition.

Figure 1D:
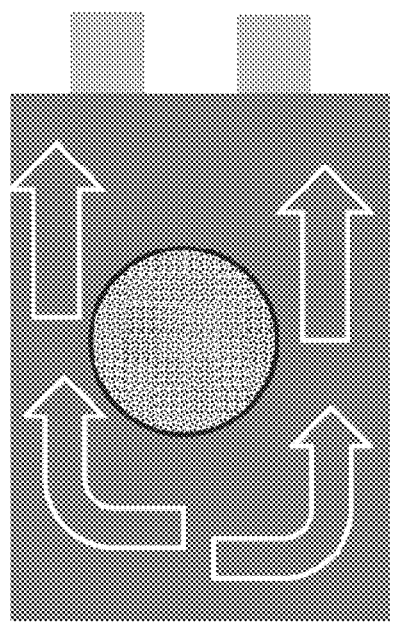

If the damage is localized and does block current from the electrode tabs, this invention may allow the remainder of the battery to function normally for some time after the damaging event. This is shown in FIG. 1D as the sweeping arrows around the point of damage and capacity removed from the battery by means described in this invention.

A battery electrode assembly according to the present invention includes a current collector having conduction barrier regions. The conduction barrier regions having a conductive state in which electrical conductivity through the conduction barrier region is permitted, and a safety state in which electrical conductivity through the conduction barrier regions is reduced. The conduction barrier regions change from the conductive state to the safety state when the current collector receives a short-threatening impact. An electrode material can be connected to the current collector.

The conduction barrier regions can be large areas of the current collector, or can even comprise substantially the entire current collector. The current collector can alternatively comprises a plurality of electrical isolation subregions defined at least in part by the conduction barrier regions formed in the current collector. The isolation subregions have a conductive state in which the isolation subregions are not electrically isolated from other isolation subregions, and a safety state in which at least one isolation subregion is electrically isolated from at least one adjacent isolation subregion such that electrical conductivity through the adjacent isolation subregions in the safety state is reduced or eliminated entirely. The electrical isolation subregions changing from the conductive state to the safety state when respective conduction barrier regions defining the isolation subregions are changed from the conductive state to the safety state. An isolation subregion can be electrically isolated from every adjacent isolation subregion when in the safety state, or can be partially isolated or partially disconnected from the remainder of the current collector such that conduction through the subregion is substantially reduced.

Figure 2:
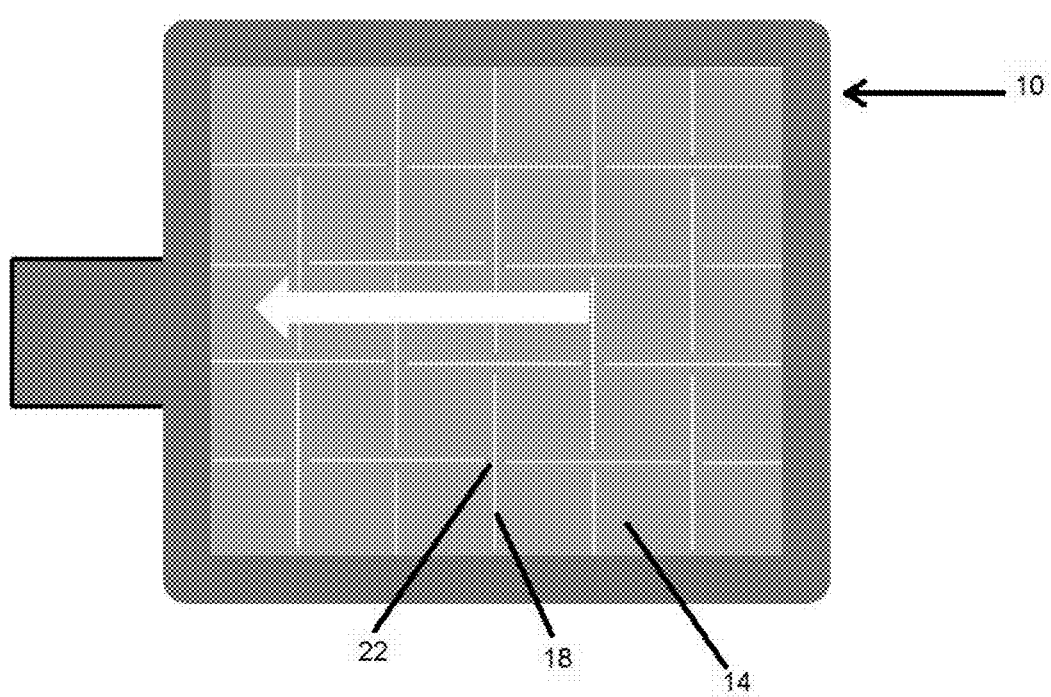
FIG. 2 is a schematic diagram illustrating current flow through an electrode in the conductive state.

There is shown in FIG. 2 a battery electrode according to the invention where the electrode 10 has been divided into a plurality of isolation subregions 14 by conduction barrier regions 18. The conduction barrier regions can include voids extending through the current collector or surface scoring which will facilitate the tearing or extending of the voids to interconnect them and electrically isolate respective isolation subregions. The conduction barrier regions can be slits or related structure such as perforations. The current collector areas 22 between adjacent slits will permit the flow of current during normal battery operation, as illustrated by the arrow in FIG. 2. The voids or slits will be extended into areas 22 of the conduction barrier regions upon receipt of a distorting force which will extend the affected voids so as to cause them to interconnect and isolate the isolation subregions from the remainder of the electrode.

The area of the isolation subregion can be selected to limit the battery capacity that can be discharged through the isolation subregions to less than the capacity which causes sufficient IR heating to initiate thermal runaway of a fully charged battery. The dimension of the subregions is less than 1 $cm^2$ for Li-ion battery electrodes. The area of the isolation subregions can be selected to limit discharge capacity to <10 mAh while in the safety state. The resistance of the conduction barrier regions when in the safety state can be at least 1000 times larger than the resistance in the conductive state.

The conductive barrier regions can be changed from the conductive state to the safety state by physical deformation of at least a portion of the current collector. The physical deformation of the current collector acts to cause physical deformation of at least one conduction barrier region of at least one isolation subregion to change the at least one isolation subregion from the conductive state to the safety state. The conduction barrier regions can include voids in the current collector such that the physical deformation causes an expansion of the voids.

The conduction barrier regions can have differing designs. The conduction barrier regions can comprise interconnecting slits as shown in FIG. 2. It has been found that a transverse relationship of adjacent voids or slits, shown in FIG. 2 works well to extend the voids into adjacent voids so as to interconnect the voids under a distorting force. Other designs are possible.

Figure 3:
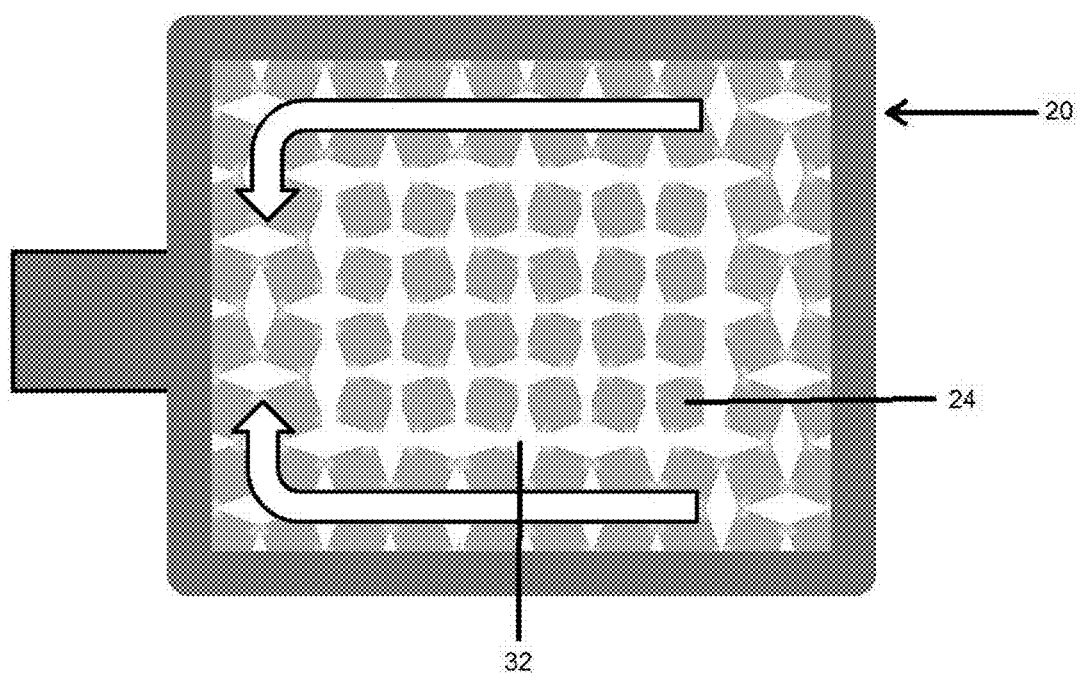
FIG. 3 is a schematic diagram illustrating current flow through an electrode in the safety state.

There is shown in FIG. 3 an electrode 20 in which a number of small isolation subregions 24 have been removed from the electrode by a physical impact to create a large opening 32 in the affected area. The impact has acted to open or extend conduction barrier regions 32 and in the case of the affected area interconnected them such that the affected isolation subregions 24 become completely disconnected from the rest of the electrode 20 as shown. Current can flow in the electrode 20 around the large opening 32 as shown by the arrow in FIG. 3.

A test was performed with anode and cathode sheets prepared using standard Li-ion battery methods. Coatings were prepared on commercial battery grade copper and aluminum foils using a slot die coater. The active electrode materials were $Li[Ni_xCo_yAl_z]O_2$, hereafter NCA, for the cathode and battery grade graphite, hereafter Gr, for the anode. These were mixed with appropriate binders and other additives, conventional for Li-ion battery. The coatings were compacted with a calendar machine. The coating was single sided, but double sided coatings will be the same.

The pouch cell electrodes were punched with a modified clicker die in a standard press to create slits as conduction barrier regions. Outer dimension of each electrode piece, excluding the tab, was 8.64 cm×5.8 cm for anode and 8.44 cm×5.6 cm for cathode. The clicker die set was modified to include a slit pattern, shown in FIG. 3, to create a 5×5 pattern of squares in the middle of each electrode. Each square was approximately 0.64 cm on a side, each slit being 0.96 cm long. The square pattern was designed so each slit was separated from the next with spacing, identified as area 22 in FIG. 2, of $\frac{1}{6}^{th}$ of the slit length, or 0.16 cm in this example. The slits extended through the thickness of the battery sheet including active material and current collector, although designs are possible in which the slits do not extend completely through the thickness of the battery sheet. To completely separate a square from the electrode, 4 connections must break.

Figure 4:
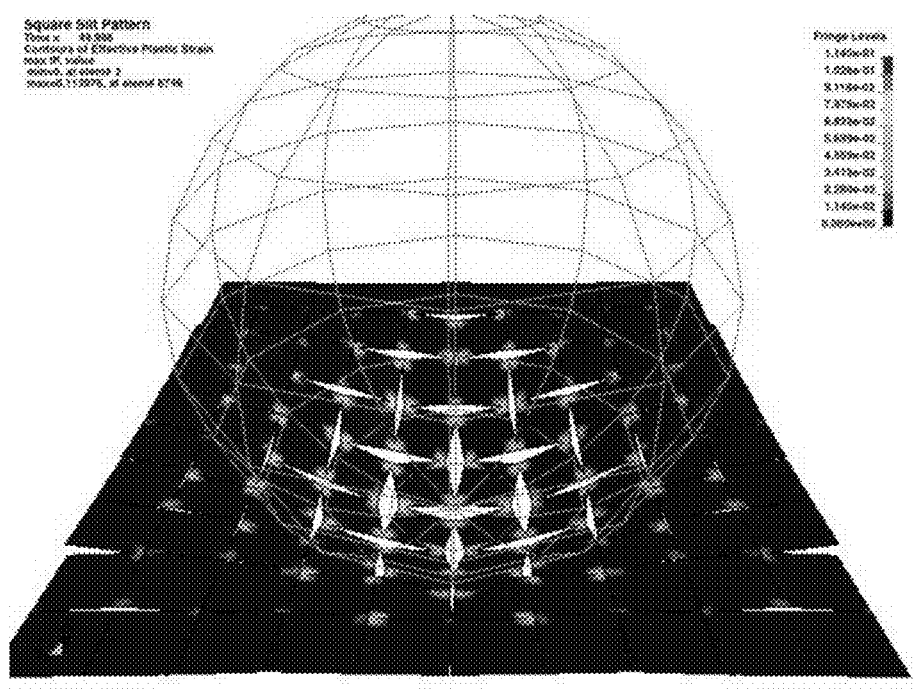
FIG. 4 is an illustration of a simulation of a short-threatening event at an initial stage.
Figure 5:
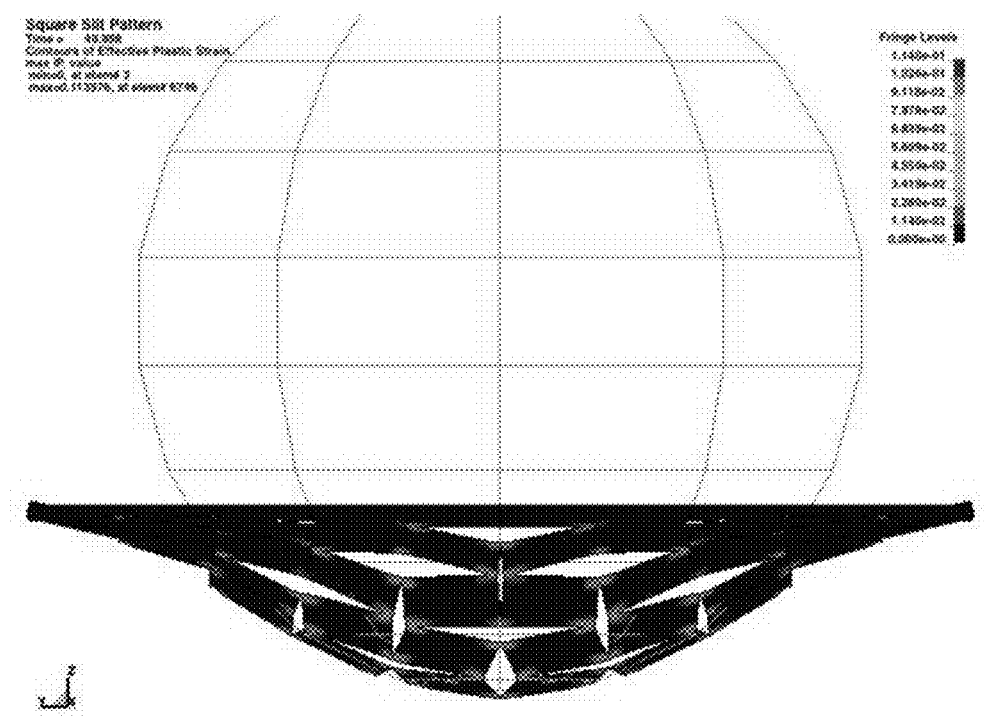
FIG. 5 is an illustration of a simulation of a short-threatening event at an advanced stage.

This slit pattern was tested in a computer model using a finite element method. The results of this computer model are presented in FIGS. 4-5 as snapshots of the process. As shown in FIGS. 4-5, a sphere shape is pressed into an electrode with the slits. With increasing deformation, the slits open up, each square area rotates and eventually the 4 connections of each square break apart.

The anode and cathode pieces were assembled into a normal vacuum sealed pouch cell with commercial separator, liquid electrolyte, and welded metal tabs. Cells were tested with a single layer of anode and cathode, approximately 80-90 mAh capacity when cycled 4.2 to 2.5 V. Multilayer electrode cells were also made and tested with capacity of 1 to 1.2 Ah.

Cycling of the batteries with and without the slits were indistinguishable for many cycles. Very long lifetime testing, beyond 30-100 cycles, was not done. The first several cycles for each battery followed the conventional forming protocol which provided for formation of the protective solid electrolyte interphase, SEI layer, at the Gr anode. The deformation test was designed to reproduce the conditions used to calculate the effect of slits on the performance of the electrodes. A single time-frame of the model is shown in FIG. 4. Here a hard sphere is pressed against the slitted sheet. The sheet has mechanical properties that will reproduce the actual battery electrodes. It is significant that the sphere is large relative to the length of the slits.

Deformation tests in this example were conducted after 35 charge and discharge cycles of the batteries. The batteries tested were single layer, about 90 mAh cells. Here the "modified" battery is the one with the 5×5 square slit pattern in the center of both the anode and cathode. For testing, the batteries were fully charged to 4.2V.

The batteries were confined between a thin plexiglass sheet and the flat surface of ballistic-grade plastilina clay. This was to emulate a battery stack contained in a harder container, as typical of standard prismatic batteries, and also prevents the battery from wrinkling during deformation. A 1-inch metal ball was pressed into the center of each battery. The loading rate of 0.01 inch per sec., but this is not believed to be critical.

At 1 inch displacement, the load was removed and ball retracted. This was sufficient to short the normal battery. The test results could not determine exactly when the squares were broken free in the modified electrode.

Figure 6:
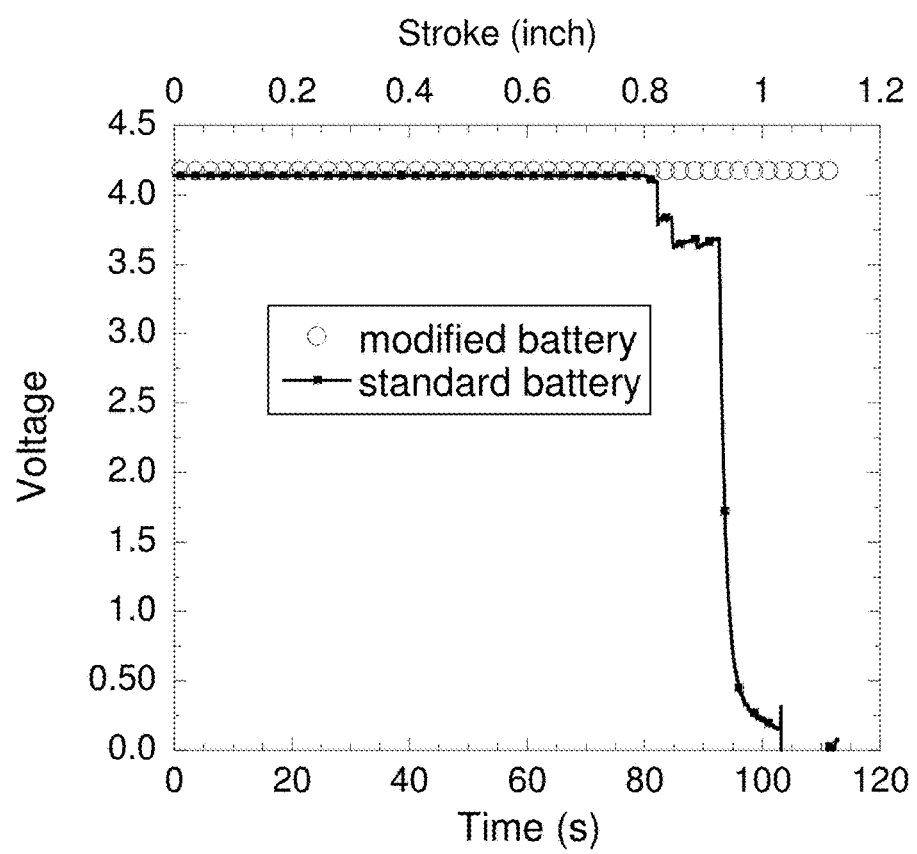
FIG. 6 is a plot of voltage v. time (s) for standard and modified batteries before and after a short-threatening event.

The battery voltage was recorded during this deformation test, as shown in FIG. 6. After deformation, the standard battery (filled square symbols) is clearly shorted and fully discharged to near zero volts. Attempts to recharge the standard battery failed. It is dead. Attempts to measure the heat generated by the short failed because the mounting materials (clay and plastic) interfered.

Figure 7:
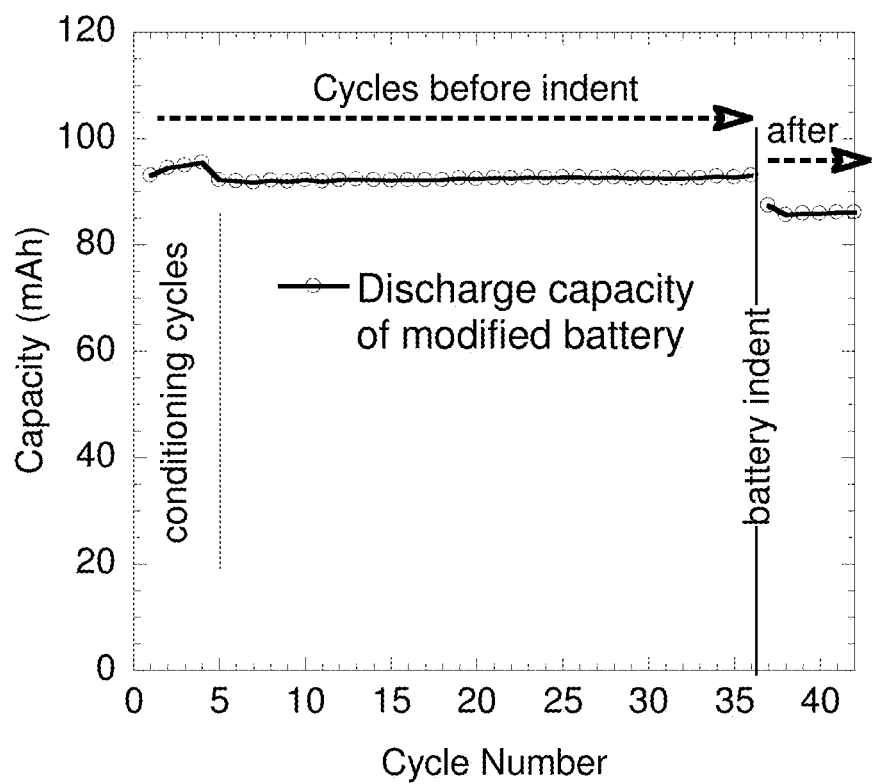
FIG. 7 is a plot of capacity (mAh) v. cycle number of a modified battery before and after a short-threatening event.

In contrast, the modified battery with the slits (open circle symbols), showed no indication of any shorts. The battery voltage remained steady during indent and then retraction of the metal ball. Cycling was continued and appeared normal except for a somewhat lower capacity, as shown in FIG. 7. The decrease in capacity is consistent with the area removed by breaking the 25 squares, away from the remaining battery area.

After cycling, as shown in FIG. 7, the modified battery was stored for over a month. There was no detectable discharge of the battery during this storage Another test was performed with a cell which was identical to the above except that liquid electrolyte was omitted, so the separator between anode and cathode is dry. This is referred to as a "dry cell". It cannot be cycled. Such a test is done for simplicity as it saves the time needed to form the SEI during initial battery cycles. Also the cell is easily opened for examination after mechanical testing.

For dry cell tests, an external battery, such as a commercial AA cell, is connected in parallel to the sample dry battery. If the sample dry cell is shorted, the external battery is discharged through the short. This is observed as a decrease in the voltage of the external battery.

A dry battery with electrodes as described in the above example was tested without the liquid electrolyte. The deformation test was identical to the one described above by pushing the metal ball into the center. The modified battery of the invention was never shorted during the 1-inch deformation. The standard battery became shorted when deformed about 0.7 inches. This short persisted until the load was removed.

The batteries were opened after deformation. For the modified battery, each electrode had the 25 small squares punched free from the rest of the electrode area. The separator sheet did not appear to be torn, and it was determined that the electrodes broke before the separator. For the standard battery, the electrode was torn in an irregular way. Several pieces were separated from the larger electrode area, but many of the torn and distorted areas were still attached and likely the reason for the short. This duplicates and confirms the results in the first example. Also the modified battery electrodes broke as predicted by the model leaving 25 small squares completely separated from each other and the center of both the anode and cathode electrode sheets.

Figure 8:
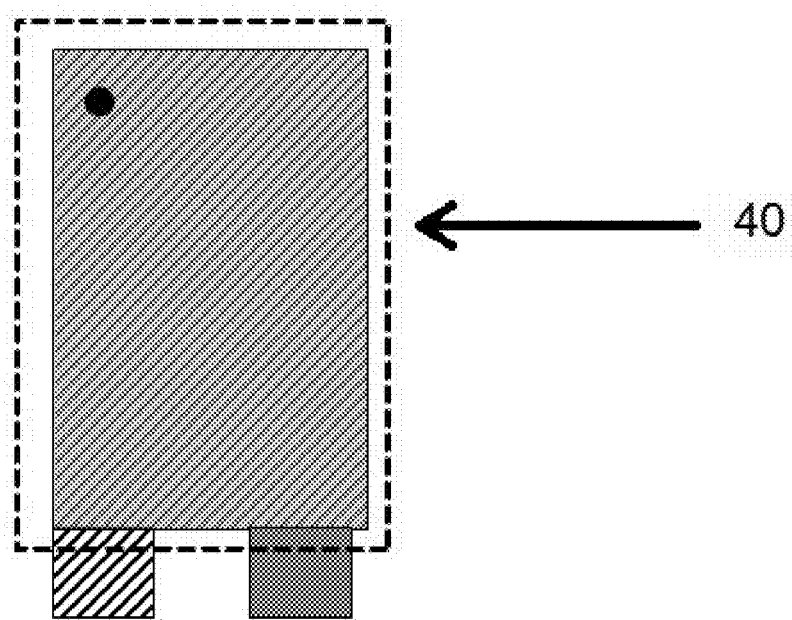
FIG. 8 is a schematic diagram of a standard battery and a short-threatening event.
Figure 9:
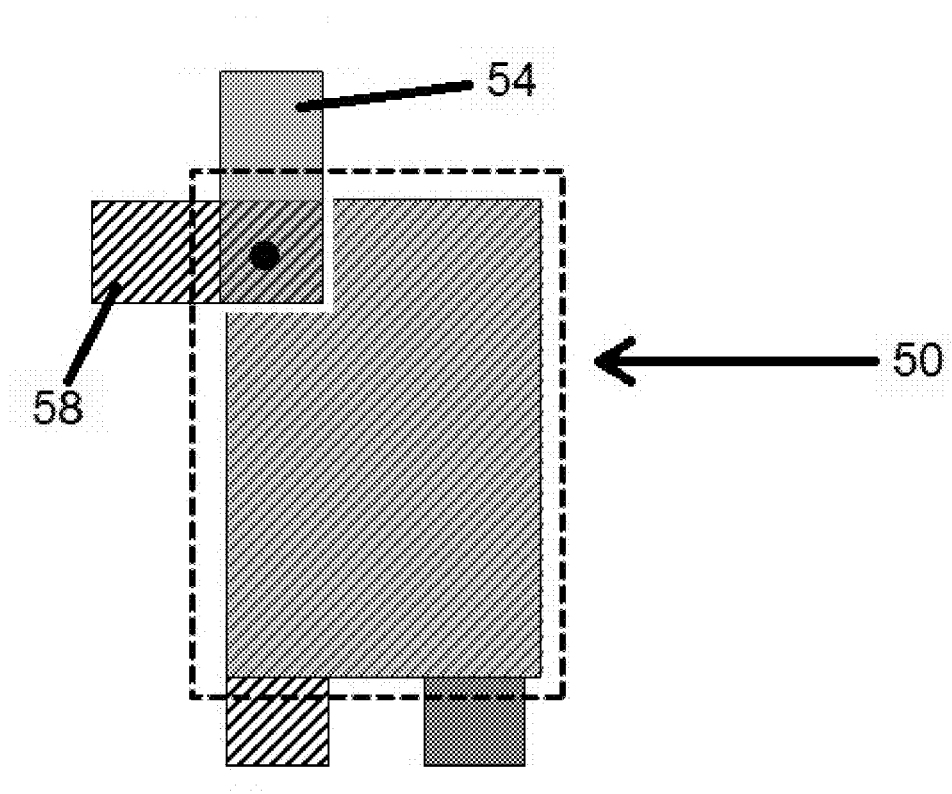
FIG. 9 is a schematic diagram of a modified battery and a short threatening event.

There is shown if FIGS. 8-9 an example which illustrates that the heat generated by a short is much reduced when the battery area is electrically isolated from the rest of the battery. A standard battery 40 with full electrodes is shown in FIG. 8. The modified battery 50 of the invention is shown in FIG. 9, and is made with electrodes having electrical isolation subregions 54 and 58 (superimposed on one another in FIG. 9).

The batteries were fully charged to 4V. Each battery was then shorted with a stainless steel dart at the corner, shown as the black dot. For the standard battery 40, this causes a short that heats the entire battery surface. The heating was recorded with an infrared camera as a movie video. Analysis showed that the surface temperature increased to a maximum of 19 degrees Celsius at 3 seconds after the short. For the modified battery, when shorted at the corner, the heating was limited to just a few degrees and it was localized to the corner near the short. The large area of this battery remained at the 4V charged state and was not discharged, as shown in Table 1:

TABLE 1

| battery | Before short | | After short at the dot | |
| --- | --- | --- | --- | --- |
| | Cell voltage | temperature | Voltage | Max. temp increase |
| A  2 sections | 4 V | 23° C. | 4 V | +2° C. at the short |
| B  1 section | 4 V | 23° C. | 0 V | +19° C. over all battery area |

Figures 10A, 10B, 10C:
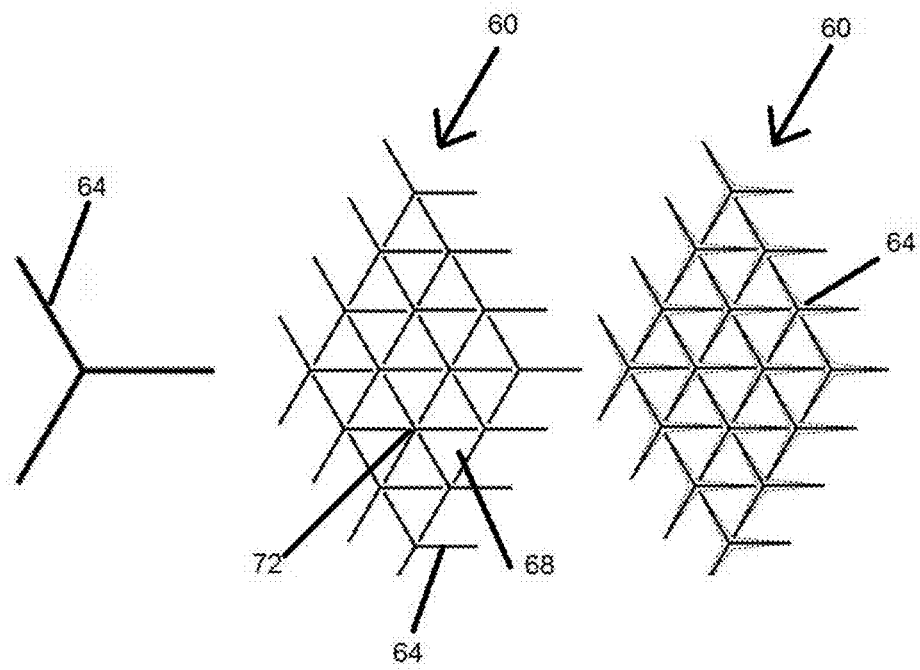
FIGS. 10A, 10B and 10C are schematic diagrams-illustrating an FIG. 10A) alternative Y-shaped conductive barrier region pattern.

Many different patterns for the conduction barrier regions and electrical isolation subregions can be envisioned. The triangle pattern (FIG. 10A-C) is predicted to be an effective design by the computer model, but has not been tested in experiment. The battery electrode 60 includes conduction barrier regions 64 defining electrical isolation subregions 68 which are triangular. The conduction barrier regions 64 are Y-shaped and the isolation subregions are triangular. Area 72 between adjacent subregions are extended so as to interconnect when the electrode is distorted (FIG. 10C).

The number and shape of the conduction barrier regions and the electrical isolation subregions can vary. At least two isolation subregions can have different dimensions. The differently dimensioned isolation subregions can be provided on the current collector as a gradient. The gradient can vary at least one of the pattern and the size of the pattern of the isolation subregions.

Figure 11:
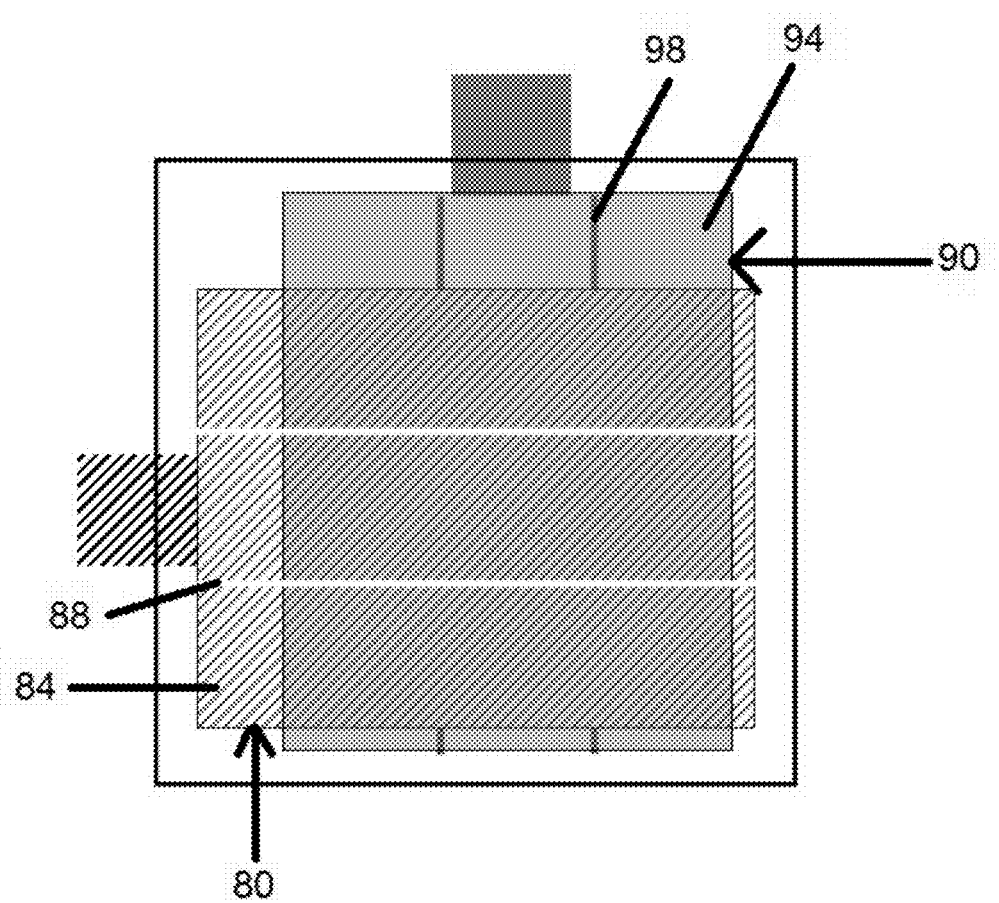
FIG. 11 is a schematic diagram illustrating overlapping elongated electrical isolation subregion strips, in the conductive state.
Figure 12:
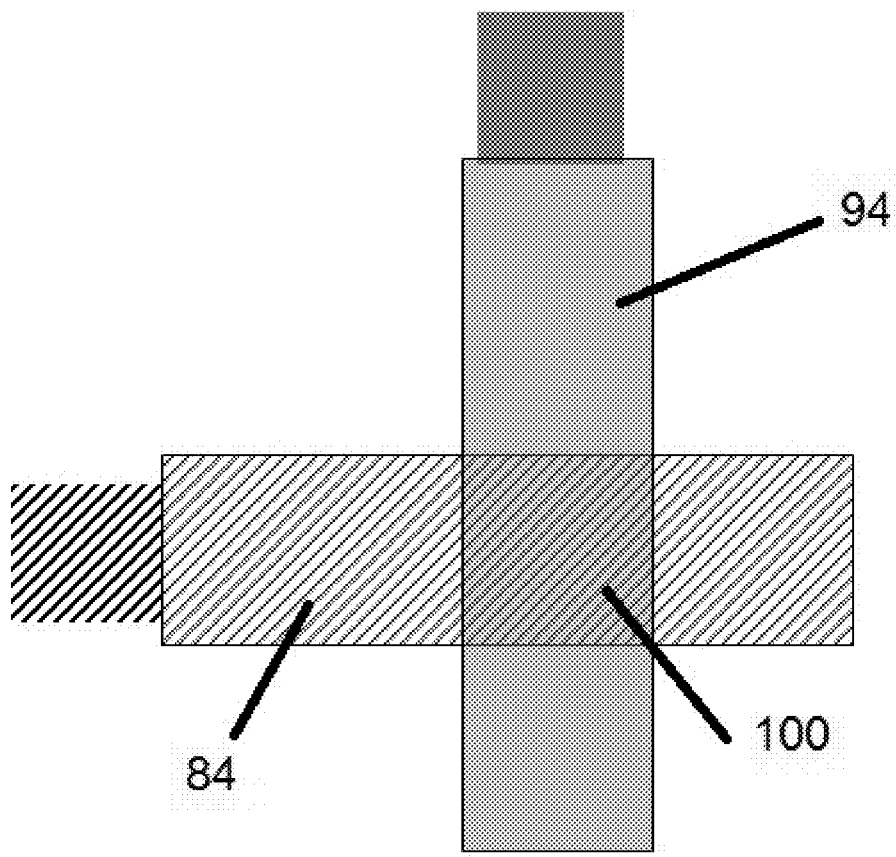
FIG. 12 is a schematic diagram illustrating the overlap region of overlapping electrical isolation subregion strips.

There is shown in FIGS. 11-12 an embodiment in which the electrical isolation subregions are provided as elongated strips. Anode 80 can have elongated isolation subregions 84 defined by conduction barrier regions 88. Cathode 90 can have elongated isolation subregions 94 defined by conduction barrier regions 98. The elongated isolation subregions can overlap in overlapping subregions 100 (FIG. 12).

With the anode and cathode strips orthogonal as shown in FIGS. 11-12, the overlap area 100 is smaller than that of each strip. A short at the overlap area 100 will immediately discharge the square of the overlap. Over a longer period of time, some of the capacity along the length of the shorted strips may also be discharged through the short, but at a far slower rate and with less heating. This is because of the long pathway ions must travel between the non-overlapping areas of the electrode strips. Results of such an experiment show that the capacity discharged through the short is limited by the overlap area and the maximum observed heating was +4° C.

The infrared camera shows a gradual increase in temperature along the length of the strip due to heat conduction along the metal. The challenge for this design is that when mechanically deformed, the entire length of the conduction barrier regions defining the strip must rapidly disconnect, even if deformation is limited to one end or one section of the strip.

Figure 13:
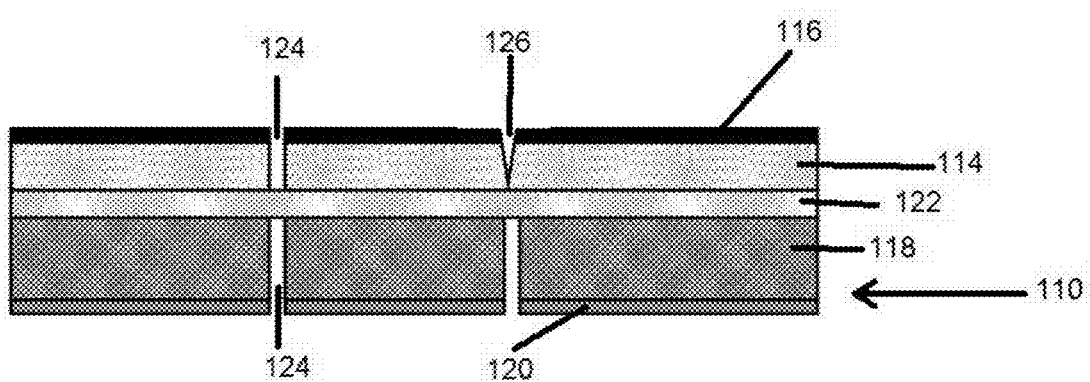
FIG. 13 is a schematic cross section of an electrode according to an embodiment of the invention.

FIG. 13 shows a possible battery layer structure 110 with anode 114 and anode current collector 116, and cathode 118 and cathode current collector 120. These layers may, depending on the type of battery, be much (5-100×) thicker than either of the metal current collectors or the separator 122. In an operating battery the anode 114 and cathode 118 layers and their respective metal current collectors are continuous.

FIG. 13 shows these layers separated into electrically disconnected subregions by voids 124 which are the conduction barrier regions. Because the metal current collector is the most electrically conductive component of each electrode assembly, it is important that the metal layer become completely disconnected from neighboring subregions. The active electrode coatings 114 and 118 are also electrically conductive, but are generally many orders of magnitude less conductive than the metal foil current collectors 116 and 120.

Typically one of the more conductive electrodes is graphite. The conductivity through a typical graphite anode coating is 1 S/cm. In the present invention, the best outcome is complete separation of the active layer and the metal current collector layer as shown in 3 of the 4 separations. But the invention should be very effective even if small residual areas of the active anode or cathode layers remain connected, as shown by the V-notched partial separation 126 at the 4$^{th}$ connection in FIG. 13.

Figure 14:
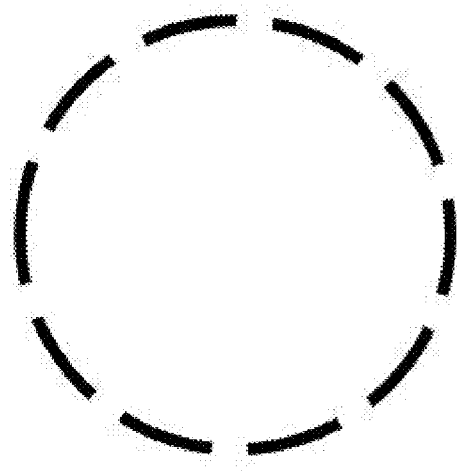
FIG. 14 is a schematic diagram of a circular conduction barrier region pattern according to an alternative embodiment.
Figure 15:
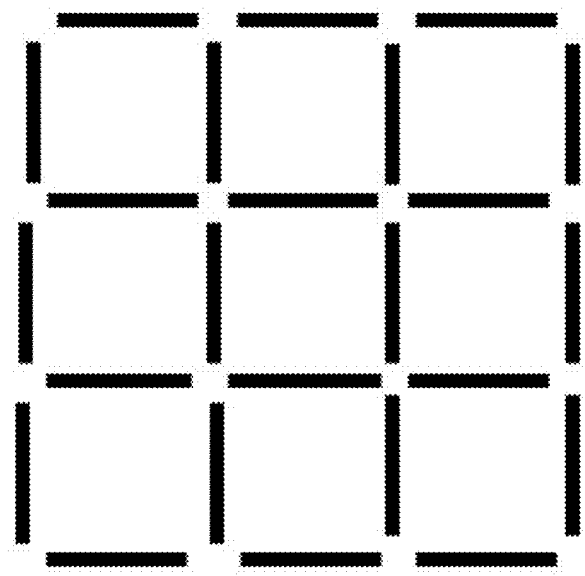
FIG. 15 is a schematic diagram of a rectangular conduction barrier region pattern according to an alternative embodiment.

Other ways to cut the slits and other patterns were tested. For example, a circular slit pattern as shown in FIG. 14 and a simple square pattern shown in FIG. 15 were laser cut through the copper and aluminum current collector foils. These perforated sheets did not break apart as easily when deformed as the electrodes described in previous examples having transversely oriented conduction barrier region slits. This is likely because the patterns were too large and the connections too strong and too numerous.

The patterns for the conduction barrier regions can be cut with a variety of tools, blades, die-cut, laser, water jet, for example. Any suitable method for forming the conduction barrier regions can be utilized. The pattern can be cut into just the current collector before coating with the electrode layer, or cut through the entire electrode. The pattern can penetrate all the way through the sheet or just score part of the thickness. The size and scale of the pattern can be selected for different mechanical damage events that are anticipated. The pattern may be designed for a particular battery and a particular application, using, for example, different patterns or sizes of pattern at different areas of the battery electrodes.

Figure 16:
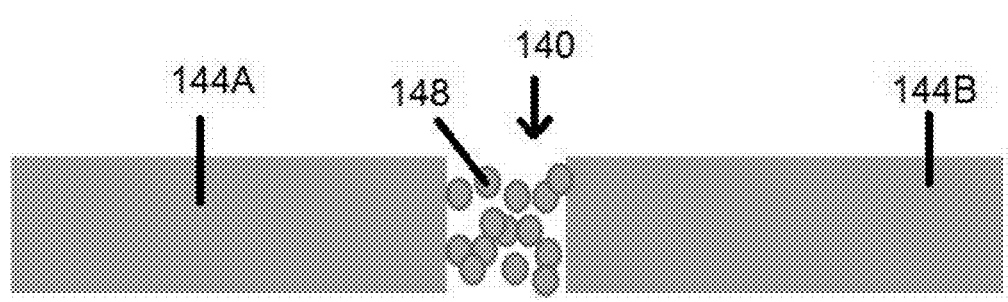
FIG. 16 is a schematic cross section of a particle filled conduction barrier region.
Figure 17:
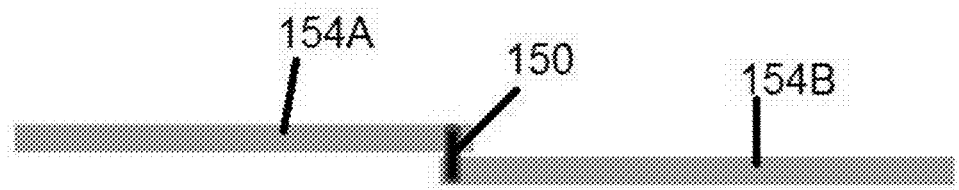
FIG. 17 is a schematic cross section of a spot weld or adhesive conduction barrier region.
Figure 18:
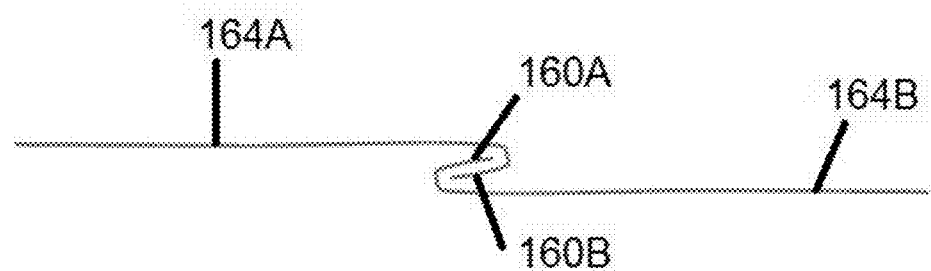
FIG. 18 is a schematic cross section of interlocking folds forming a conduction barrier region.

In addition to the voids or slits described above, there are numerous other ways to make conduction barrier regions as weak seams in the battery electrodes that can be opened during mechanical deformation. Several are shown in FIGS. 16-18. FIG. 16 shows a conduction barrier region 140 between electrical isolation subregions 144A-B. The conduction barrier region is filled with lightly fused metal particles 148 which will conduct when in the conductive state, but can be pulled apart when the electrode is impacted to place the isolation subregions 144A-B in the safety state. FIG. 17 shows a spot weld or adhesive 150 securing electrical isolation subregions 154A-B together at conduction barrier region 158. FIG. 18 shows interlocking folds 160 A-B connecting isolation subregions 164 A-B together in the conduction state, and which can pull apart if the electrode is impacted to place the isolation subregions in the safety state.

Figure 19:
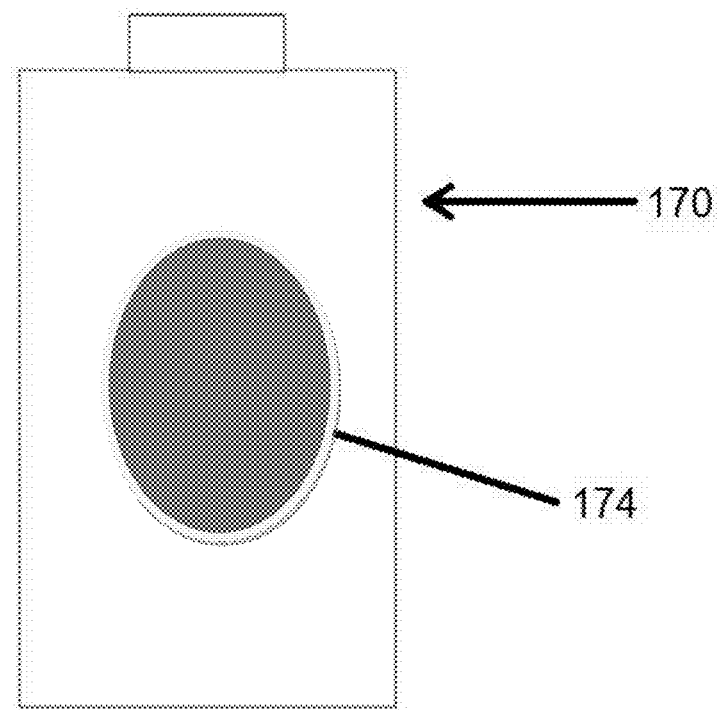
FIG. 19 is a schematic diagram an electrode according to an alternative embodiment of the invention.

Another way for the electrodes to break into pieces when deformed is to incorporate a brittle component into the electrode structure. In this case electrical isolation subregions may not be necessary. A brittle component will break with little or no plastic deformation, and thus reduce the strain to failure. This is very different from a metal which is inherently ductile. Thin metal foils, such as those used as battery electrodes, will elongate to several percent strain before rupture. Thin polymer sheets, such as the biaxially oriented polyethylene teraphthalate used here, will elongate as much as 60 to 160% to break. However, when the polymer is made brittle, the elongation to break is much reduced to <10% strain, or to <1% to break. This embodiment is shown in FIG. 19, where electrode 170 is comprised of a brittle polymer material which when impacted between a ball and a hard surface will break away as a circular or ovoid fragment to form a non-conductive void area 174 which will prevent a short from extending to the entire electrode 170. In the embodiment, the conduction barrier region material forms essentially the entire electrode or most of the electrode, and rather than separating an electrical isolation subregion, it is the conduction barrier region itself that separates upon impact. Very thin metal films which can be applied to a brittle supporting material to form the current collector of this embodiment. Thin metal foils may plastically stretch to a few percent strain in tension tests before rupture, Small Scale Mechanical Characterization of Thin Foil Materials via Pin Load Microtesting; R. Wheelerl, A. Pandey, A. Shyam, T. Tan, and E. Lara-Curzio; Experimental Mechanics (2015) 55:1375-1387, the disclosure of which is incorporated by reference, whereas with metal films on a brittle support, the elongation to rupture will be much smaller.

For the battery safety, it is preferred that the current collector and electrode assembly of the invention break before the battery separator in the same or in a comparable impact test. For a typical battery separator, the tensile strength is 130 to 165 kgf/cm$^2$ transverse to the machine direction.

Figure 20A:
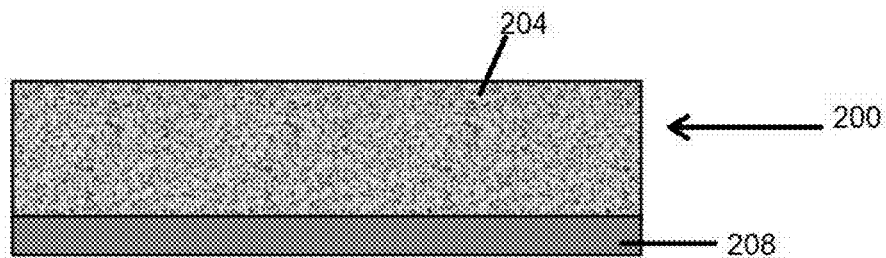
FIGS. 20A, 20B and 20C are schematic cross sections of an electrode having a FIG. 20A) standard active material on metal foil configuration.
Figure 20B:
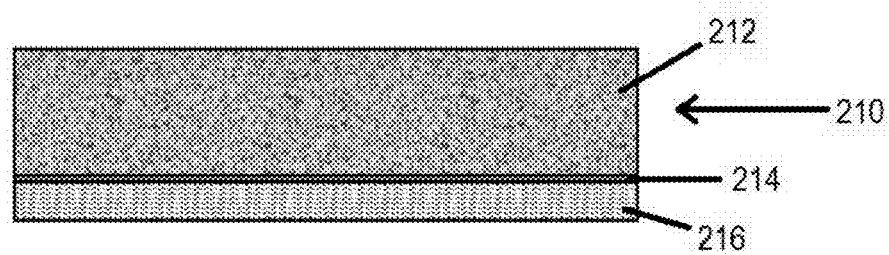
Figure 20C:
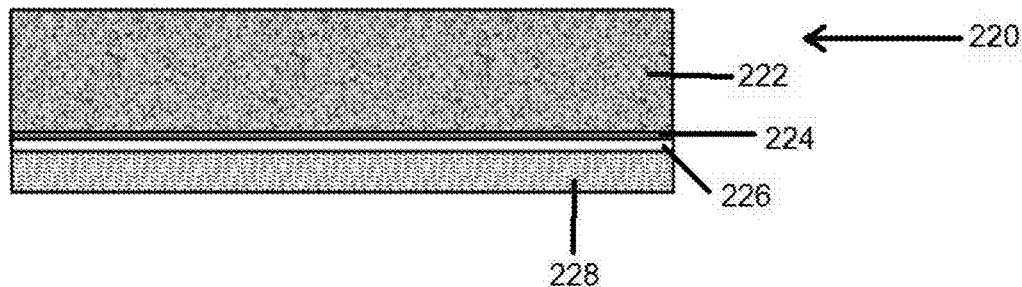

There is shown if FIG. 20A-C an illustration of this embodiment. FIG. 20A is a prior art current collector 200 with electrode material 204 an metal foil 208. FIG. 20B is an electrode 210 in which electrode material 212 is placed on a thin foil 214 coated on a brittle support such as polymer 216. The metal foil current collector 200 is replaced with a metallized polymer sheet electrode 210. The example uses biaxially oriented polyethylene teraphthalate (PET), 12 or 25 or 100 micrometers thick. The polymer is coated (commercially or in house) with a thin layer of copper or aluminum, typically by a sputter deposition processes. The copper and aluminum were less than 1 micrometers thick, sufficient for electrical conduction of the current collector, but thin enough to be easily torn.

The metallized PET was coated with the standard active battery graphite anode and NCA cathode slurries using standard roll to roll coating equipment. The slurry coatings were then dried. The coated PET electrodes were punched to the desired shape again using standard equipment. At this stage the electrode sheets were strong enough for such fabrication. In this example, the metal and electrode coating was applied to only one side of the PET.

Figure 21:
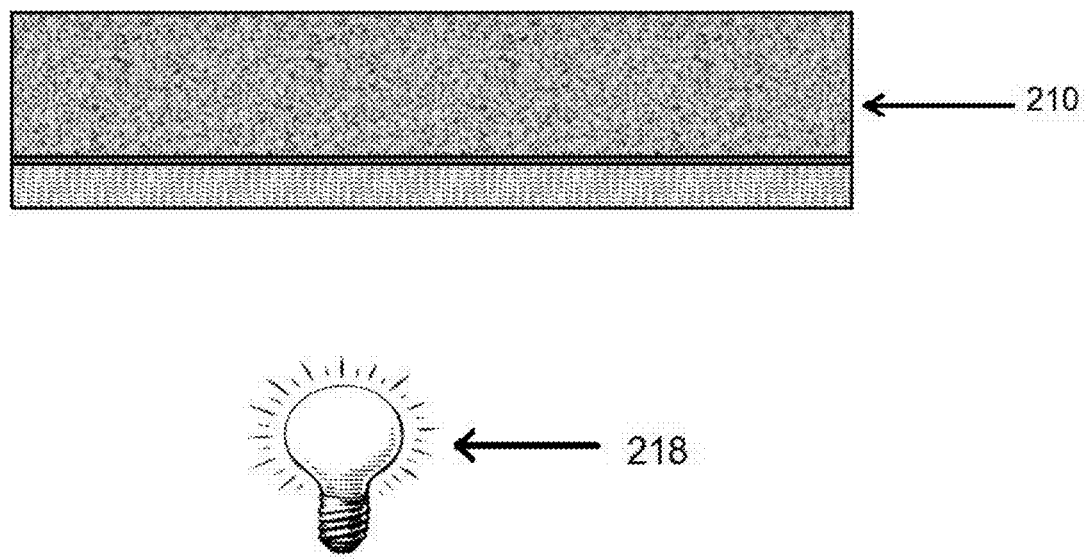
FIG. 21 is a schematic diagram illustrating a method for rendering a polymer support brittle for the electrode shown in FIG. 20B.

After forming the electrodes, the PET was made brittle by exposure to ultraviolet (UV) light from a mercury lamp 218, as shown in FIG. 21. The embrittlement was accelerated by allowing the lamp to heat the PET to approximately 100° C.

There are other ways to make polymers brittle that can be used, including thermal, chemical, and radiation treatments. Some polymers can be made brittle by curing, while others are made brittle by other treatments. Also there are additives that would make the polymer more susceptible to becoming brittle by such treatments. The polymer can be selected such that its strain to failure after curing can be reduced by at least 5 or 10-fold by embrittlement treatment. The strain to failure must then be comparable or lower than that of the of the battery separator material. For a typical battery separator, the tensile strength is 130 to 165 kgf/cm$^2$ transverse to the machine direction. The elastic limit of the polymer after curing can be reduced at least 10-fold from the elastic limit before curing.

The brittle electrodes were then assembled into several different pouch type batteries. Testing by impact deformation was performed with a different deformation than for prior examples. The battery or dry cell was placed on a firm surface such as linoleum floor tiles or a stack of old pouch batteries. A metal ball or ceramic cylinder, with diameters of ½ and 1 inch were place on top of the live or dry battery. A 3-inch brass ball, ~2 kg, was dropped onto the smaller ball or cylinder from a distance of about 3 feet. This dented the battery and the underlying support.

Figure 22:
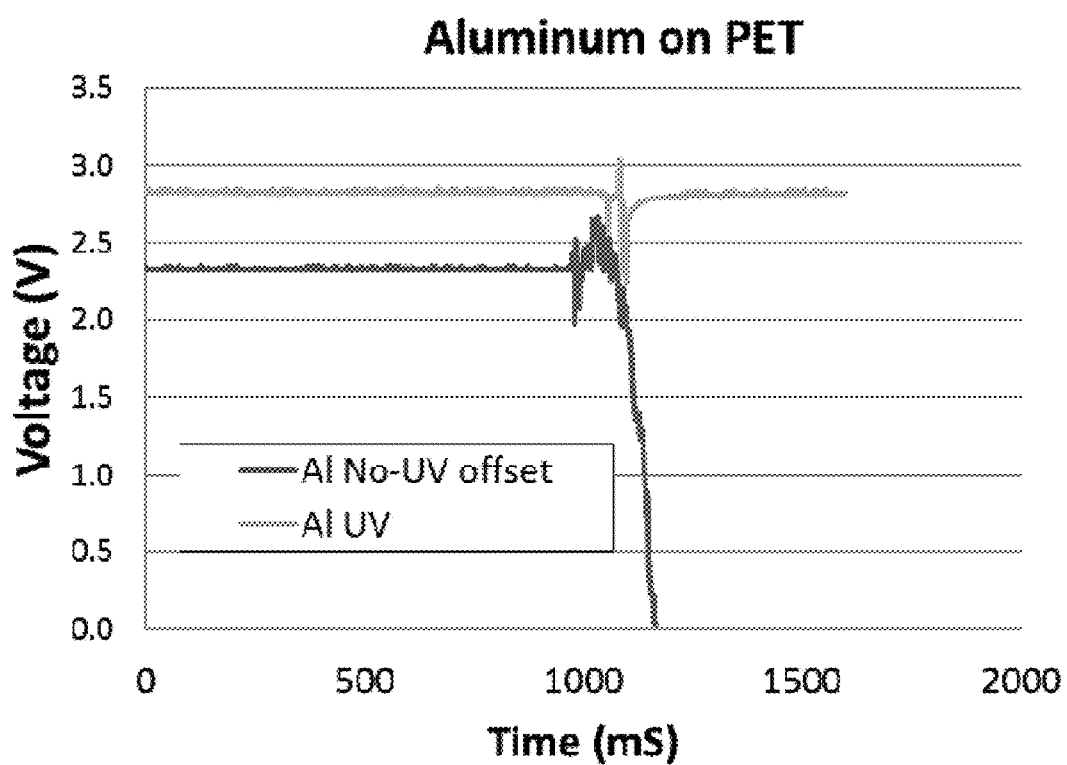
FIG. 22 is a plot of voltage (V) v. time (mS) for aluminum of PET with and without UV treatment of the PET.
Figure 23:
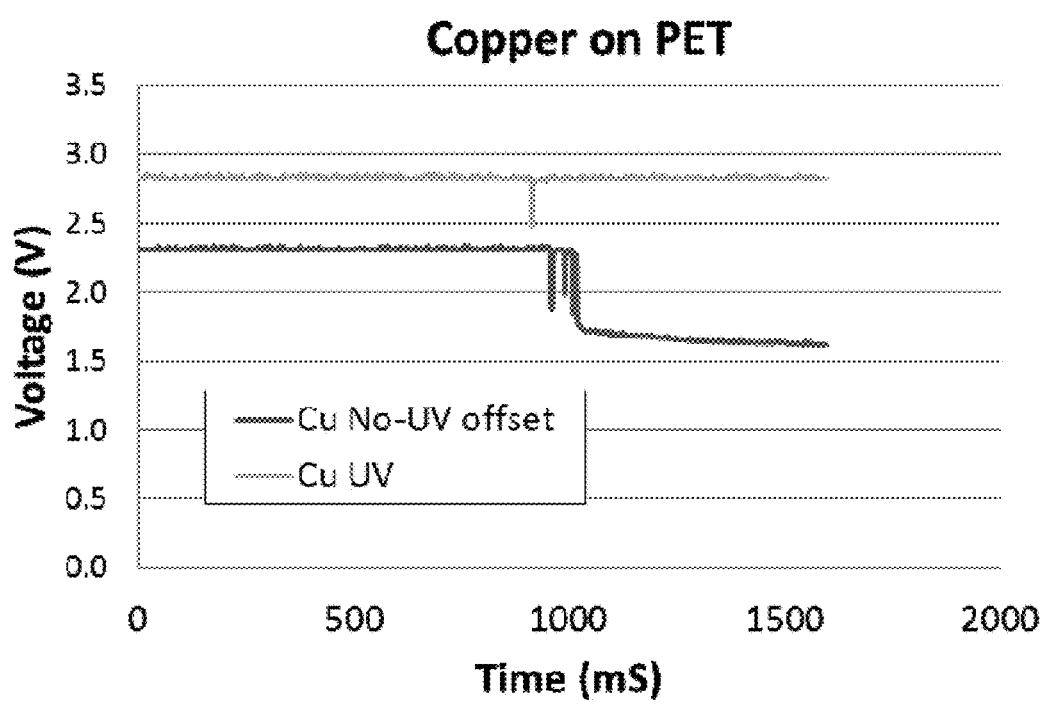
FIG. 23 is a plot of voltage (V) v. time (mS) for copper on PET with and without UV treatment.

The resulting deformation for this test is smaller than for the prior examples. As shown in FIGS. 22-23 using a just the Cu and Al metallized PET current collector sheets with a dry battery separator, the impact test often causes a detectable short circuit between the metal electrodes. FIGS. 22-23 compare the performance of the metallized PET electrodes with and without the UV treated to make it brittle. For this test, the PET was 100 micrometers thick, and the Cu and Al coatings about 500 nanometers. Any short between two metallized sheets was detected as a measureable decrease in the voltage of the external battery. The brittle sheets in both cases showed no or only momentary shorts, while the untreated electrodes showed shorts that lead to discharge of the external battery.

When the dented sheets were disassemble and examined, the UV treated sheets were fractured. A circular area about the size of the ball or cylinder used for the test was punched loose from the sheet. The untreated sheets where plastically deformed, but not broken by the impact. Similar results were observed for electrodes formed of PET coated with both indium tin oxide and the Cu and Al coating. This multilayer current collector is shown in FIG. 20C, where the electrode 220 has an active material 222 on a metal foil 224 that is supported by glass or ceramic 226 on a polymer sheet or metal foil 228. Such a brittle glass or ceramic layer may be used to enhance or modify the brittle fracture behavior of the current collectors. Replacing the metal foils with metallized polymer sheet, such as the Cu and Al coated PET, has other advantages, including lower cost and lighter weight.

The polymer can be treated to make it brittle. Embrittlement treatment is referred to as any process which will alter the polymer to render it brittle. Embrittlement here can be defined as a reduction in the polymer's ductility to reach strain to failure values lower than that of the separator used in the battery with a comparable or lower tensile strength than that of the separator. The polymer might be made brittle with UV lamp, or heat, or possibly with a chemical treatment (such as ozone), or possibly with an electron beam treatment. Additives to the polymer may make it more susceptible to becoming brittle.

The polymer can be masked in order to pattern the brittle areas. The polymer is then treated with UV lamp where the polymer is exposed. Note that with electron beam and other penetrating treatments, the polymer might be fully coated with metal and electrode and can be treated with such penetrating treatments.

Figure 24:
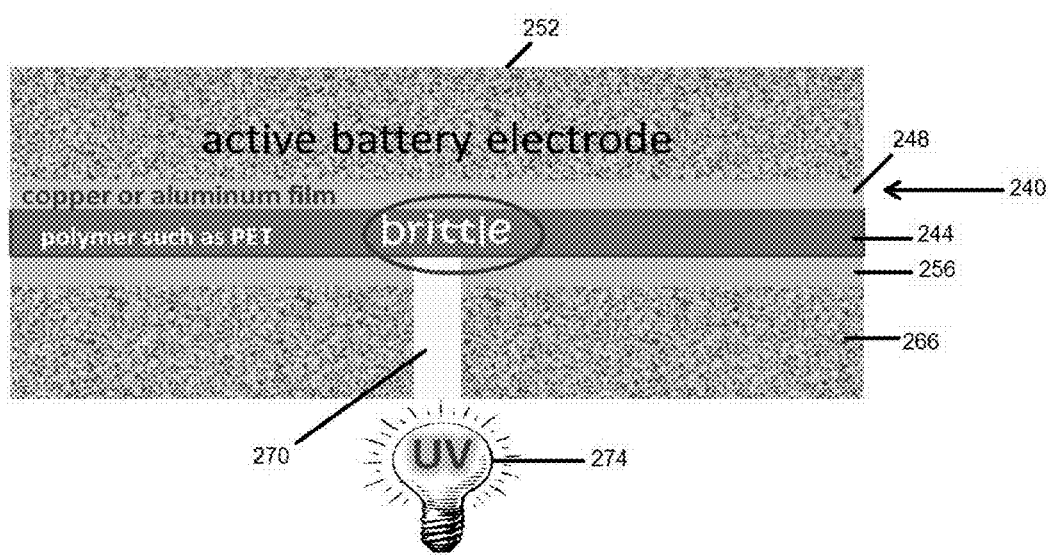
FIG. 24 is a schematic cross section illustrating localized UV treatment of a polymer support using a patterned active material with voids.

There is shown in FIG. 24 an embodiment in which an electrode 240 combines the slitted electrode with the UV embrittled polymer. The electrode 240 has a polymer sheet 244 that supports on one side a metal foil 248 and an active material 252. One the opposite side of the polymer sheet 244 there is another metal foil layer 256 covered by a foil 260 and an active material 266. The foil 260 and active material 266 have a slot 270 by which UV treatment from UV lamp 274 can be used to cure and embrittle the polymer sheet 244 but only where the voids 270 are present. This allows for a wider range of deformation processes.

Electrodes, both NCA cathodes and Gr anodes, supported on metalized PET were fabricated. The PET sheet was about 25 micrometers thick. The electrode 240 was cut with the 5×5 square slit at the center area of each piece. This example compares the performance of these electrodes with and without the UV treatment to make the PET more brittle.

Single layer batteries were prepare and cycled. Single layer dry batteries were also prepared. The electrodes and batteries were tested using impact tests with small ½ inch ball impact. This test was done with electrodes in a dry cell attached to an external battery.

For electrodes that were not UV treated, the electrodes were dented, but remained fully connected. No shorts were detected. For electrodes that were UV treated to make the PET brittle, sections of both electrodes were punched out by the impact. No shorts were detected and the separator was not torn. The punched out sections were irregular in shape, with some edges having straight sides following the slits cut in the electrodes, but other edges being circular following the fracture pattern of the brittle PET. In a live and charged battery, these punched out areas would prevent shorts from discharging the whole battery. Dry cell was also tested with large 3-inch ball impact. As above, impact with the large ball did not break the slitted electrode unless it was treated with the UV lamp to make the PET layer brittle. This test was done with electrodes in a dry cell attached to an external battery.

The conduction barrier regions can include transverse, non-connecting elongated regions, physical deformation of the current collector causing at least one of the transverse conduction barrier regions to be physically deformed and extended so as to intersect with an adjacent transverse conduction barrier region to cause at least one associated isolation subregion to change from the conductive state to the safety state.

The electrode assembly can include multilayer coatings of at least one selected from the group consisting of metal, carbon, ceramic and glass films on a polymer support. The current collector can comprise multilayer coatings of at least one selected from the group consisting of metal, carbon, ceramic and glass films on a metal support.

A method of making an electrode includes the step of forming in a current collector conduction barrier regions having a conductive state in which the conductive barrier regions are not electrically isolated from other isolation subregions, and a safety state in which at least one isolation subregion is electrically isolated from at least one adjacent isolation subregion such that electrical conductivity through the adjacent electrical isolation subregions in the safety state is reduced. Active materials can be formed on the current collector according to methods known in the art, and batteries according to the invention can be of any suitable design and made by any suitable method. The invention can be used with conventional battery construction and assembly technologies. In the case of electrodes incorporating polymer supported conducting films where the polymer is made brittle by a subsequent treatment such as UV light, the invention permits some assembly while the polymer is in the flexible state, and then by subsequent UV treatment can be made brittle.

Ranges: throughout this disclosure, various aspects of the invention can be presented in a range format. It should be understood that the description in the range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range for example, 1, 2, 2.7, 3, 4, 5, 5.3 and 6. This applies regardless of the bread of the range.

This invention can be embodied in other forms without departing from the spirit or essential attributes thereof, and accordingly, reference should be had to the following claims to determine the scope of the invention.

We claim:

1. A battery electrode assembly, comprising a current collector comprising conduction barrier regions having a conductive state in which electrical conductivity through the conduction barrier region is permitted, and a safety state in which electrical conductivity through the conduction barrier regions is reduced, the conduction barrier regions changing from the conductive state to the safety state when the current collector receives a short-threatening event; and, an electrode material connected to the current collector;

wherein the current collector comprises a plurality of electrical isolation subregions defined at least in part by the conduction barrier regions formed in the current collector, the isolation subregions having a conductive state in which the isolation subregions are not electrically isolated from other isolation subregions, and a safety state in which at least one isolation subregion is electrically isolated from at least one adjacent isolation subregion such that electrical conductivity through the adjacent isolation subregions in the safety state is reduced, the electrical isolation subregions changing from the conductive state to the safety state when respective conduction barrier regions defining the isolation subregions are changed from the conductive state to the safety state.

2. The battery electrode assembly of claim 1, wherein the area of the isolation subregion is selected to limit the battery capacity that can be discharged through the isolation subregions to less than the capacity which causes sufficient Joule heating to initiate thermal runaway of a fully charged battery.

3. The battery electrode assembly of claim 2 wherein the dimension of the subregions is less than 1 $cm^2$ for Li-ion battery electrodes.

4. The battery electrode assembly of claim 3, wherein the area of the isolation subregions is selected to limit discharge capacity to <10 mAh while in the safety state.

5. The battery electrode assembly of claim 1, wherein in the safety state the resistance of the conduction barrier regions is at least 1000 times larger than the resistance in the conductive state.

6. The battery electrode assembly of claim 1, wherein the conductive barrier regions are changed from the conductive state to the safety state by physical deformation of at least a portion of the current collector, the physical deformation of the current collector acting to cause physical deformation of at least one conduction barrier region of at least one isolation subregion to change the at least one isolation subregion from the conductive state to the safety state.

7. The battery electrode assembly of claim 6, wherein the conduction barrier regions comprise voids in the current collector and the physical deformation is an expansion of the voids.

8. The battery electrode assembly of claim 6, wherein the conduction barrier regions comprise transverse, non-connecting elongated regions, physical deformation of the current collector causing at least one of the transverse conduction barrier regions to be physically deformed and extended so as to intersect with an adjacent transverse conduction barrier region to cause at least one associated isolation subregion to change from the conductive state to the safety state.

9. The battery electrode of claim 8, wherein the isolation subregions are rectangular.

10. The battery electrode of claim 8, wherein the isolation subregions are triangular.

11. The battery electrode assembly of claim 1, wherein the conduction barrier regions comprise voids extending through the current collector.

12. The battery electrode of claim 11, wherein the conduction barrier regions comprise slits.

13. The battery electrode of claim 12 wherein the barrier regions comprise interconnecting slits.

14. The battery electrode of claim 13, wherein the interconnecting slits are Y-shaped and the isolation subregions are triangular.

15. The battery electrode assembly of claim 1, wherein at least two isolation subregions have different dimensions.

16. The battery electrode assembly of claim 1, wherein differently dimensioned isolation subregions are provided on the current collector as a gradient of at least one selected from the group consisting of the pattern and the size of the pattern of the isolation subregions.

17. The battery electrode assembly of claim 1, wherein in the safety state an isolation subregion is electrically isolated from every adjacent isolation subregion.

18. The battery electrode assembly of claim 1, wherein the current collector is metal.

19. The battery electrode of claim 1, wherein the current collector comprises a metalized polymer.

20. The electrode assembly of claim 1, wherein the electrode assembly comprises multilayer coatings of at least one selected from the group consisting of metal, carbon, ceramic and glass films on a polymer support.

21. The electrode assembly of claim 1, wherein the current collector comprises multilayer coatings of at least one selected from the group consisting of metal, carbon, ceramic and glass films on a metal support.

22. The electrode assembly of claim 1, wherein the current collector is comprised of bonding sections bonded together by at least one selected from the group consisting of adhesive and spot welds.

23. The battery electrode assembly of claim 1, wherein the current collector comprises a polymer and the conduction barrier regions of the polymer have been rendered brittle.

24. The battery electrode assembly of claim 23 wherein the polymer is treated to be brittle and the polymer is selected such that its tensile strength is reduced by at least 10-fold after treatment.

25. The battery electrode assembly of claim 23 wherein the polymer is treated to be brittle and the elastic limit of the polymer after treatment is reduced at least 10-fold from the elastic limit before treatment.

26. The battery electrode assembly of claim 1, wherein the conduction barrier region comprises perforations.

27. The battery of claim 1, wherein in the electrical conductivity between adjacent isolation subregions in the safety state is eliminated.

28. A battery, comprising:
an anode electrode comprising an anode current collector and an anode electrode material;
a cathode electrode comprising a cathode current collector and a cathode electrode material;
at least one of the anode current collector and the cathode current collector comprising a current collector comprising conduction barrier regions having a conductive state in which electrical conductivity through the conduction barrier regions is permitted, and a safety state in which electrical conductivity through the conduction barrier regions is reduced, the conduction barrier regions changing from the conductive state to the safety state when the current collector receives a short-threatening event; and an electrolyte;
wherein the anode current collector and the cathode current collector comprise a plurality of electrical isolation subregions defined at least in part by conduction barrier regions formed in the current collector, the isolation subregions having a conductive state in which the isolation subregions are not electrically isolated from other isolation subregions, and a safety state in which at least one isolation subregion is electrically isolated from at least one adjacent isolation subregion such that electrical conductivity through the adjacent isolation subregions in the safety state is reduced.

29. The battery of claim 28, wherein the electrical isolation subregions of the anode current collector and the electrical isolation regions of the cathode current collector define overlapping isolation regions.

\* \* \* \* \*